Patented Jan. 30, 1951

2,539,631

UNITED STATES PATENT OFFICE 2,539,631

METHOD OF MODIFYING DRYING OILS AND FRICTION MATERIAL CONTAINING MODIFIED DRYING OIL

Joseph N. Kuzmick, Passaic, N. J., assignor to Raybestos-Manhattan, Inc., Passaic, N. J., a corporation of New Jersey No Drawing. Application February 11, 1948, Serial No. 7,709

3 Claims. (Cl. 106—253)

This invention relates to improvements in the production of friction materials and, particularly, to the employment of a modified drying oil of the linseed oil type in the production of such friction materials, and to the novel character of the modified drying oil and the method of producing same.

The present invention is characterized by the employment of drying oils of the non-conjugated type or drying oils of the linseed oil type, such as linseed oil, soybean oil and other drying or semi-drying oils, all collectively termed herein "drying oils," in gel form as the binder, or as a binder component, in the manufacture of friction materials, such as clutch facings and, particularly, brake linings, as distinguished from the prior employment of oxidized or chemically treated oils of the same type in liquid form as the binder.

Although the modified oil of the present invention may be found suitable as a binder component in the production of friction materials of various character and by various processes, it is particularly adapted to the production of molded or extruded brake linings wherein a mixture is made of short fibrous asbestos, drying oil-containing binder and petroleum solvent for the binder, to produce a granular mix which is fed between a pair of pressure rolls and continuously formed into a dense continuous strip which is subsequently heat-cured to volatilize the solvent and to harden the binder.

In the present commercial practice, the binder oil is generally employed in normally liquid condition, dissolved in a solvent to reduce its viscosity to make it sufficiently fluid and to uniformly wet the fibrous asbestos, fillers and other components making up the friction material composition. In the subsequent curing operation the oil goes through the stage first of gelation and then through complete polymerization and at the same time the incorporated solvent is volatilized. During this curing operation, the solvent evaporates through the surfaces of the friction material, and even though attempts have been made to control and balance the temperatures in the curing ovens so as to first volatilize the solvent and thereafter progressively cure the binder, the evaporation of the solvent carries with it portions of the oil to the surfaces, that is, the oil sweats and surface films prematurely cure and form a case-hardened film on the surfaces of the friction material due to the necessity of the employment of elevated oven temperatures for volatilizing the solvents which generally have appreciable boiling ranges, such as from 200° F. to 400° F. This prevents proper penetration of heat into the center of the friction material being cured and results in under-cure in the center, and entrapment of solvent in the thickness or interior of the friction bodies, inhibiting cure or hardening at the interior of the bodies. Further, the evaporation of the solvent and the carrying with it to the friction material surfaces of some of the binder oil from the interior leaves less oil in the interior than on the surfaces. In other words, the oil in the center is caused to migrate toward the surfaces of the friction body being cured as a result of the evaporation of the solvent, thus causing a greater concentration of oil on the surfaces and adjacent the surfaces than in the interior, resulting in the production of friction bodies of a non-homogeneous character and improper cure and entrapment of solvent in the interior of the friction body. The present commercial practices, in addition, require curing periods sometimes as long as twenty-eight to thirty hours and considerable skill in attempting to balance the evaporation of the solvent and rate thereof in order to minimize premature cure of the binder, and sweating and case-hardening thereof prematurely on the surfaces of the friction bodies being cured.

In accordance with the present invention, it is proposed to pre-treat the binder oil so as to pre-oxidize it and to partially pre-polymerize it with the object in view of obtaining more uniform cure of the incorporated binder to result in friction materials of a more homogeneous and improved character and to reduce the heating or curing time heretofore required.

My invention will be hereinafter described with respect to the modification of linseed oil and employment of the linseed oil as a binder in the production of molded friction materials and, particularly, brake linings. Thus, in accordance with the present invention, I subject linseed oil to treatment with an oxygen-containing gas, such as by blowing it with air at a low temperature such as from about 70° F. to 200° F., suitably at 150° F., until the oil has absorbed approximately 16% to 20% by weight of oxygen at which time the blowing treatment is terminated and the oil is still a fluid at normal room temperature. This oil is then heat-treated at temperatures ranging from about 250° F. to about 350° F., suitably at about 300° F., for a period of time which may be as long as forty-eight hours to produce a low degree of polymerization, the heat treatment being discontinued when gelation is evident at room temperature and the product is still soluble in petroleum solvents, such as mineral spirits, gasoline, varnish makers' naphtha, and the like. This gel is non-pourable at room temperature but is capable of being liquefied at temperatures of 200° F. or above.

In the production of friction materials to which my gelled oil is particularly adapted, the mixes prepared may in general comprise from 50% to about 75% by weight of short asbestos fibers and from about 0% to 25% of organic or inorganic fillers of the conventional type and from about 16% to 50% by weight of binder solids. The binder solids may comprise from 25% to 100% of the conjugated or linseed oil type of drying oil and may include rubbers, resins, or other binders.

Solvent for the binder or binder components is employed in limited amount adequate only to dissolve them and to permit them to thoroughly wet and to be intimately distributed with the asbestos and other filler solids, so that the ultimate mix may be in the form of granular flowable particles, as distinguished from large lumps of soft stock which cannot be extruded between and slides away from the nip of the forming or molding rolls. High or excessive solvent proportions also result in shrinkage and subsequent distortion of the friction material when cured.

When employing my gelled oil binder, I dissolve it in a suitable solvent such as mineral spirits, preferably in the proportion of approximately 50% by weight of the gelled oil. I preferably do this with the gelled oil in heated condition to facilitate solution. Conveniently, this may be done after sampling shows correct gelation on cooling, and may be done at once or after the temperature of the oil is permitted to drop to approximately 20° F. in order to prevent excessive solvent evaporation, the amount of solvent added to the hot oil being sufficient to reduce its viscosity on cooling to a fluid condition and to thoroughly wet the friction material mixture to which it is added.

The following is an example for the purpose of illustration, but not limitation, of a friction material composition suitable for the described process, employing my novel gelled oil binder:

| | Per cent by weight |
|---|---|
| Gelled oil and mineral spirits (⅔ oil ⅓ spirits) | 22 |
| Asbestos fibre | 52 |
| Rubber crude | 3 |
| Cashew polymer | 5 |
| Clay | 12 |
| Sulfur | 3 |
| Litharge | 2 |
| Carbon black | 1 |
| | 100 |

The foregoing materials are intimately mixed, to uniformly distribute the components, in a mixer such as a dough type mixer until a comminuted texture and particle size is obtained with even distribution of the binder. The resultant mix is a loose mass of small granules, pebbles or nodules of fiber and is aged or tempered at room temperature for one or two days and is then pulverized in a hammer mill to produce a relatively uniform particle size, say $\frac{1}{16}$" to $\frac{1}{8}$" diameter. The resulting mass of granular particles is loose and highly compressible.

These granules are then conventionally placed in a feed hopper having an agitator paddle, and are fed between steel rolls, one having a knurled or otherwise roughened surface and the other being flanged, with a predetermined opening between the rolls and the flanges to confine the passage of the compressed material to the desired opening. The material may in this manner be molded in thicknesses of $\frac{1}{16}$" to $\frac{1}{4}$" and to a density of about 92, in continuous strip form and, depending upon the binder composition, there may be simultaneously fed between the rolls while the mix is being compressed, a reticulated backing, such as wire mesh, which becomes embedded in one face of the friction material as a reinforcement therefor. The resulting strip material is rolled up into coils and then subjected to curing to volatilize the solvent and to cure the binder, the treatment being generally carried out in ovens initially at progressively increasing temperatures as, for example, a progressively rising temperature of 180° F. to 400° F., as required to volatilize the solvent, and thereafter by heating, say, at 320° F., to harden the binder to form a flexible roll of the lining. Alternatively, the friction material may be cut into lengths such as, for example, equivalent to one brake segment, and these lengths further cured to form relatively non-flexible brake segments of fixed curvature.

The brake lining formed in accordance with the described process has high durability, characteristic of the structure of high compactness (85–95% of theoretical maximum) produced by close packing of fibrous granules, and frictional qualities entirely adequate for the service intended.

When employing the gelled oil of my present invention, it may be employed in the same manner as in the process hereinbefore described with the advantage of assuring more uniform cure, retention of distribution of the binder throughout the thickness of the friction element with avoidance of case-hardening on the surfaces of the friction material or entrapment of solvent in the interior of the friction body, and thus not only insure improved uniform character and greater life of the friction material but also an overall reduction in time required for oxidation and polymerization of the binder in situ due to its pre-treatment. For example, when employing my improved gelled oil binder in friction material compositions of the class hereinbefore described, the cure time is in the range of 20 to 24 hours at 320° F., as compared to an identical mix with regular blown oil in fluid condition substituted for my gelled oil which has a cure range of 48 to 60 hours.

I claim as my invention:

1. The method of oxidizing and polymerizing drying oils of the non-conjugated type to form thereof a friction material composition binder characterized by its ability to be more uniformly cured and more rapidly heat-hardened in such composition, which comprises subjecting an oil of said type to treatment with an oxygen containing gas at a temperature of about 70° F. to 200° F. until about 16% to 20% oxygen has been incorporated and terminating said treatment before the oil has lost its fluidity at normal room temperature, and polymerizing the oil by heating it at a temperature between approximately 250° F. to 350° F. until the oil becomes a gel at normal room temperature melting above 200° F. and remains soluble in petroleum solvents.

2. The method of modifying linseed oil to form an improved binder for friction material compositions, which comprises subjecting linseed oil to treatment with an oxygen containing gas at a temperature of about 70° F. to 200° F. until 16% to 20% oxygen has been incorporated and terminating said treatment before the oil has lost its fluidity at normal room temperature, and polymerizing the oil by heating it at a temperature between approximately 250° F. and 350° F. until the oil becomes a gel at normal room temperature melting above 200° F. and remains soluble in petroleum solvents.

3. A friction material molding composition comprising a mixture of short fibrous asbestos, drying oil binder and binder solvent, said drying oil binder resulting from subjecting linseed oil to treatment with an oxygen containing gas at a temperature of about 70° F. to 200° F. until 16% to 20% oxygen has been incorporated and terminating said treatment before the oil has lost its fluidity at normal room temperature, and polymerizing the oil by heating it at a temperature between approximately 250° F. and 350° F. until the oil becomes a gel at normal room temperature melting above 200° F. and remains soluble in petroleum solvents.

JOSEPH N. KUZMICK.

REFERENCES CITED

The following references are of record in the file of this patent:

UNITED STATES PATENTS

| Number | Name | Date |
|---|---|---|
| 1,438,222 | Craven | Dec. 12, 1922 |
| 1,975,672 | Vahlteich | Oct. 2, 1934 |
| 1,992,601 | Blume | Feb. 26, 1935 |
| 2,207,686 | Schwarcman | July 9, 1940 |

FOREIGN PATENTS

| Number | Country | Date |
|---|---|---|
| 2,295 | Great Britain | of A. D. 1879 |
| 215,334 | Great Britain | Oct. 15. 1925 |